B. H. HARTMAN.
SKINNING KNIFE.
APPLICATION FILED MAY 1, 1916.

1,241,969.

Patented Oct. 2, 1917.

WITNESSES
Roland T. Williams
Wm. F. Leaman

INVENTOR
Bertrand Homer Hartman

BY Richard B. Owen
ATTORNEY.

UNITED STATES PATENT OFFICE.

BERTRAND H. HARTMAN, OF GLENBURN, NORTH DAKOTA.

SKINNING-KNIFE.

1,241,969.  Specification of Letters Patent.  Patented Oct. 2, 1917.

Application filed May 1, 1916. Serial No. 94,801.

*To all whom it may concern:*

Be it known that I, BERTRAND HOMER HARTMAN, a subject of the King of Great Britain and Ireland, residing at Glenburn, in the county of Renville and State of North Dakota, have invented certain new and useful Improvements in Skinning-Knives, of which the following is a specification.

This invention has relation to skinning knives, and the nature and objects thereof will be readily apparent to those skilled in the art to which it appertains, in the light of the following explanation of the accompanying drawings, illustrating what I now believe to be the preferred embodiment or mechanical expression of my invention from among other forms and arrangements within the spirit thereof or the scope of the appended claims.

However, an object of the invention is to provide a knife for use in removing the skin from the carcass of a hog or similar animal which is adapted to be pushed forward beneath the skin, and the skin raised while the connecting tissue is severed by the blade of the knife.

Another object of the invention is to provide means in a knife or implement of the character described whereby the cutting extent of the blade may be adjusted so as to cut a layer of any desired thickness from the hide of the animal In addition to the foregoing my invention comprehends improvements in the details of construction, and arrangement of parts to be hereinafter described and particularly pointed out in the appended claims.

In the accompanying drawings in which similar and corresponding parts are designated by the same characters of reference throughout the several views in which they appear;

Figure 1:
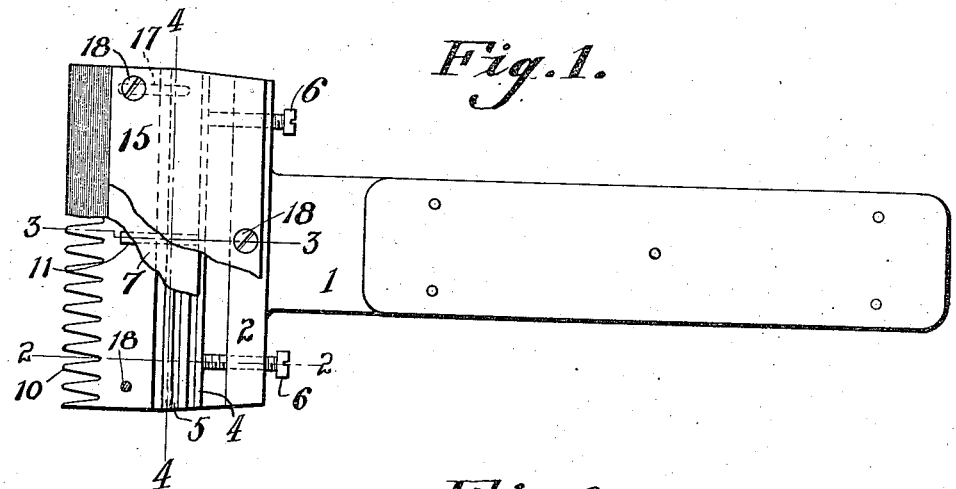
Figure 1 is a view in plan, with parts broken away illustrating an implement constructed after the manner of my invention.
Figure 2:
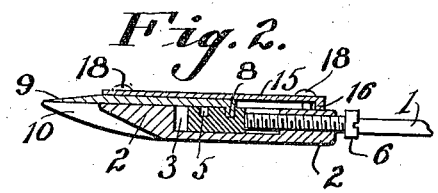
Fig. 2 is a view in section taken on the line 2—2 of Fig. 1.
Figure 3:
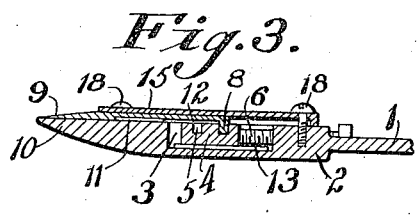
Fig. 3 is a similar section taken on the line 3—3 of Fig. 1.
Figure 4:
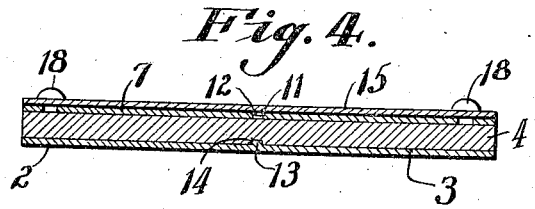
Fig. 4 is a transverse section taken on the line 4—4 of Fig. 1.

With reference to the drawings 1 indicates a handle portion formed at one end with a transversely extending blade supporting portion, or what might be termed the body portion of the implement designated 2. The body portion is formed with a longitudinal groove 3, in which is mounted a plate 4 provided with a plurality of grooves 5. Set screws 6 are mounted in threaded openings in the body portion and are adapted to engage the rear edge of the plate 4 for adjustably moving the same in a direction parallel to the linear dimension of the handle. A blade 7 having a right angular flange 8 at its rear end for engaging one of the grooves of the plate 4 is provided and is formed with a forward sharpened edge 9 for co-acting engagement with a series of guard fingers 10 formed at the forward edge of the body portion.

It will thus be obvious that the blade owing to its engagement with plate 4, may be adjusted by rotating the set screws 6, so as to expose more or less of the ends of the guard fingers, or to be extended therebeyond. A rib 11 is provided upon the upper face of the body portion for engagement with a groove 12 in the under side of the blade to preclude displacement of said blade during adjustment, and in a similar manner a rib 13 is formed at the bottom of the groove 3 of the body portion, for engaging a groove 14 of the plate 4 to likewise preclude displacement thereof during adjustment.

A cover plate 15 is disposed above the blade, and is provided at its rear end with a flange 16 to retain the plate in spaced relation above the body portion. Elongated slots 17 are formed at either end of the blade and are disposed parallel to the direction of adjustment thereof, to receive securing elements 18 which extend through the cover plate and into threaded openings in the body portion.

In operation the implement is grasped by the handle and the edge of the blade inserted beneath the skin of the animal, and with a forward pushing movement the connecting tissue is severed and the skin as it is loosened is raised by the other hand and moved back so as not to impede the cutting operation of the blade. Owing to the curvature of the under side of the guard fingers, the skin is easily separated from the carcass without taking away part of the flesh along with the skin which is what happens during a skinning operation performed with an ordinary knife. It will also be obvious that layers of various degrees of thickness may be removed by extending the cutting edge of the blade beyond the guard fingers to a greater or less extent, which may be easily determined by experiment. It has been my experience that an implement adapted to remove the skin by a forward pushing motion, for which this invention is designed is more efficacious than one adapted to be drawn longitudinally beneath the skin after the manner of an ordinary knife.

While the construction of my invention as illustrated is designed to produce the most efficient results in practice, nevertheless various ways of reconstructing the same to employ the principles involved will occur to those skilled in the mechanical arts. I therefore reserve the right and privilege of changing the forms of the details of construction, or otherwise altering the arrangement of the correlated parts without departing from the spirit of the invention or the scope of the appended claims.

Having thus fully described my invention what I claim as new and desire to secure by Letters Patent is:—

1. A skinning knife including a body portion provided with guard fingers and a longitudinal groove, a grooved plate movable in the groove, set screws mounted in the body portion and engaging the plate, a blade having a cutting edge for co-action with the guard fingers and a flange for engaging one of the grooves of the plate, and a handle formed on the body portion.

2. A skinning knife including a body portion provided with guard fingers and a longitudinal groove, a grooved plate movable in the groove, said plate having a guiding groove, a rib in the groove of the body portion and engaging the guiding groove to preclude displacement of the plate during adjustment, a blade having a flange for engaging one of the grooves of the plate, and having a guiding groove, a rib on the body portion for engaging said guiding groove to preclude displacement of the blade during adjustment, set screws mounted in the body portion and engaging the grooved plate, elongated slots provided in the blade, a cover plate superposed above the blade, threaded fastenings extending through the cover plate, the elongated openings and engaging the body portion, and a handle formed on the body portion and extending at right angles thereto.

In testimony whereof I affix my signature in presence of two witnesses.

BERTRAND H. HARTMAN.

Witnesses:
G. L. GOULD,
T. P. PARKE.

Copies of this patent may be obtained for five cents each, by addressing the "Commissioner of Patents, Washington, D. C."